United States Patent [19]

Heinze et al.

[11] Patent Number: 4,457,849
[45] Date of Patent: Jul. 3, 1984

[54] METHOD AND APPARATUS FOR FILTERING INDUSTRIAL AND HUMAN WASTE

[75] Inventors: Walter O. Heinze, Swathmore, Pa.; Wesley M. Tufts, Holliston, Mass.

[73] Assignee: International Water Saving Systems, Inc., New York, N.Y.

[21] Appl. No.: 530,027

[22] Filed: Sep. 7, 1983

Related U.S. Application Data

[63] Continuation of Ser. No. 308,586, Oct. 5, 1981, abandoned, which is a continuation of Ser. No. 146,920, May 5, 1981, abandoned.

[51] Int. Cl.³ .................... B01D 23/10; B01D 33/18
[52] U.S. Cl. .................................. 210/807; 210/288; 210/290
[58] Field of Search .............. 210/266, 265, 275, 279, 210/276, 293, 288–291, 437, 416.3, 257.1, 150, 807, 661, 793, 808; 422/139, 140

[56] References Cited

U.S. PATENT DOCUMENTS

| | | | |
|---|---|---|---|
| Re. 28,458 | 7/1975 | Ross | 210/793 |
| 246,457 | 8/1881 | Candlish | 210/437 |
| 1,818,638 | 8/1931 | McGill | 210/290 |
| 2,546,650 | 3/1951 | Nijboer | 210/807 |
| 3,319,791 | 5/1967 | Horne | 210/288 |
| 3,471,025 | 10/1969 | Dobson | 210/290 |
| 3,534,855 | 10/1970 | Guillerd et al. | 210/290 |
| 3,543,937 | 12/1970 | Choun | 210/150 |
| 3,852,193 | 12/1974 | Jakubek et al. | 210/290 |
| 4,290,894 | 9/1981 | Török et al. | 210/661 |

FOREIGN PATENT DOCUMENTS

| | | | | |
|---|---|---|---|---|
| 422926 | 5/1948 | Italy | | 210/437 |
| 1305399 | 1/1973 | United Kingdom | | 210/807 |

Primary Examiner—Benoît Castel
Attorney, Agent, or Firm—Robert T. Gammons

[57] ABSTRACT

A filter system for entraining solid matter contained in a fluid wherein a mass of particulate filter material is suspended in a fluid confined within an enclosure and the fluid containing the solid matter to be filtered therefrom is pumped into the mass of particulate filter material so as to cause weltering of the particulate material and gravitational separation of the solid matter from the fluid.

2 Claims, 14 Drawing Figures

INDUSTRIAL OR HUMAN WASTE

METHOD AND APPARATUS FOR FILTERING INDUSTRIAL AND HUMAN WASTE

This is a continuation of application Ser. No. 308,586 filed Oct. 5, 1981, which is a continuation of Ser. No. 146,920 filed May 5, 1981, both now abandoned.

BACKGROUND OF THE INVENTION

Many filters become quickly clogged by fibers and other material such as paper or textile shreds, grain husks and the like. This invention relates to providing an improved method and apparatus for filtering both industrial and human waste with the capability of recovering both the liquid and the solids for reuse or disposal and in such a way as to maintain effective filtering for long periods of time without renewal.

SUMMARY OF INVENTION

As illustrated herein, the method of this invention comprises confining a plurality of particulate bodies in fluid suspension within a tank, forcibly delivering the fluid to be filtered into the midst of the fluid-suspended bodies to cause weltering of the bodies and to cause the solid matter intercepted by and clinging to the bodies to be loosed so as to gravitate downwardly through the bodies, allowing the weltering to subside and withdrawing the filtered fluid.

In accordance with another aspect of the invention, the apparatus for carrying out the method comprises a settling tank, a bed of fluid-suspended bodies confined in said tank in loosely-associated relation to each other, and means for delivering fluid to be filtered into the midst of the bodies so as to effect weltering of the bodies as the fluid enters and realignment following entry to on the one hand promote gravitation of the solids clinging to the bodies and on the other hand to promote entrainment of the solids from the fluid rising within the tank, means for delivering the fluid to the tank and means for withdrawing the filtered fluid therefrom. The means for delivering fluid to be filtered into the midst of the bodies may be a conductor which may optionally have an imperforate portion terminating in the midst of the bodies so that the fluid is discharged through its open end into the midst of the bodies or a perforate portion containing a plurality of rectilinearly or spirally-arranged perforations through which the fluid is discharged into the midst of the bodies. There is means in the settling tank for supporting the under or lower side of the bed of particulate bodies containing perforations too small to permit the passage of the bodies therethough, but large enough to permit the filtered solids to pass. In one form, there is a removably attached receptacle at the bottom of the tank for receiving the solid matter separated from the fluid by the filtering operation. In another form, the settling tank is divided medially into a filter chamber at one side and a storage chamber at the other side, the bodies are supported in a perforated container in the filter chamber which allows the solid matter removed from the fluid to gravitate to the bottom of the chamber and there is means for transferring the filtered fluid from the filter chamber to the storage chamber. In each form, provision is made for flushing the filter comprising the particulate bodies by pumping clean water through the filter in the reverse direction. The filter bodies themselves may be solid or hollow, are of such density as to be suspended in the fluid medium, are non-absorptive of water, insoluble, non-corrosive and infrangible and may be comprised of natural or man-made materials, for example, without limitation such plastic materials as polyethylene, polypropylene, polybutane and glass-reinforced polypropylenes. Desirably, a fine filter is employed to remove the residual solids from the filtered fluid and this may be positioned between the top of the bodies and the top of the chamber or at some other point in the plumbing through which the filtered fluid is withdrawn for disposal.

The invention will now be described in greater detail with reference to the accompanying drawings, wherein:

FIG. 1 diagrammatically illustrates one form of the apparatus;

Figure 2:
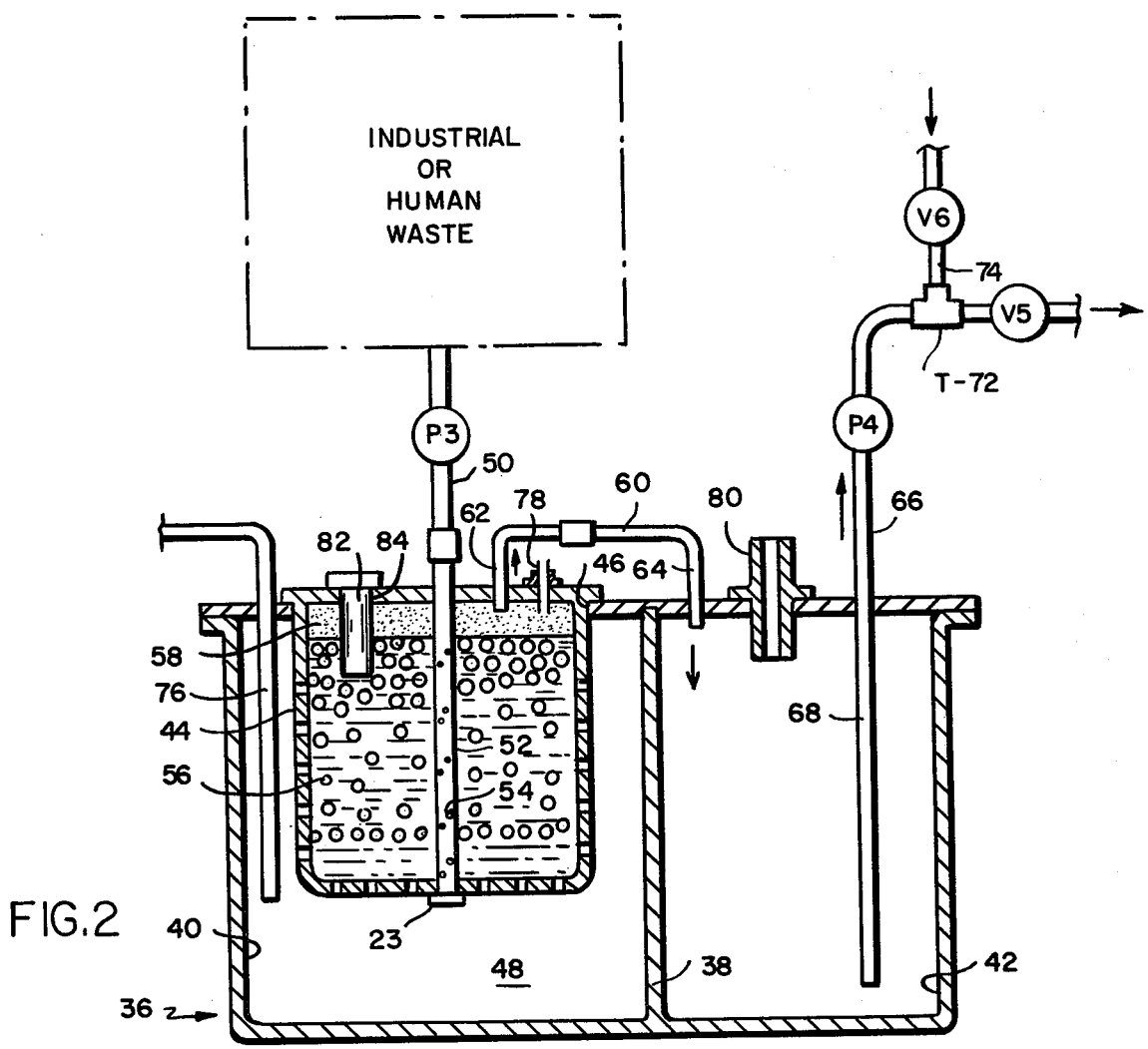
Figure 3:
Figure 3A:
Figure 4:
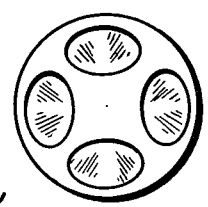
Figure 5:
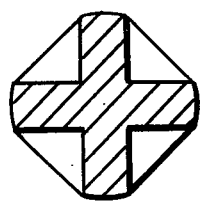
Figure 6:
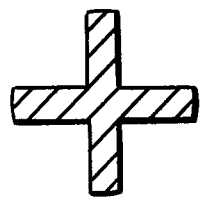
Figure 7:
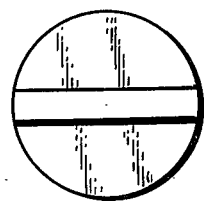
Figure 8:
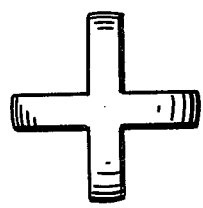
Figure 9:
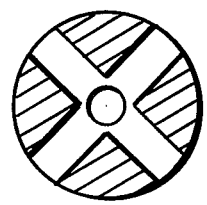
Figure 10:
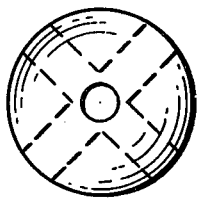

FIG. 2 diagrammatically illustrates another form of the apparatus;

FIG. 3 is an elevation of a spherical filter body;

FIG. 3A is an elevation of pear-shaped, elliptical and kidney-shaped filter bodies; and FIGS. 4 to 10 depict other forms of filter bodies.

Figure 1:
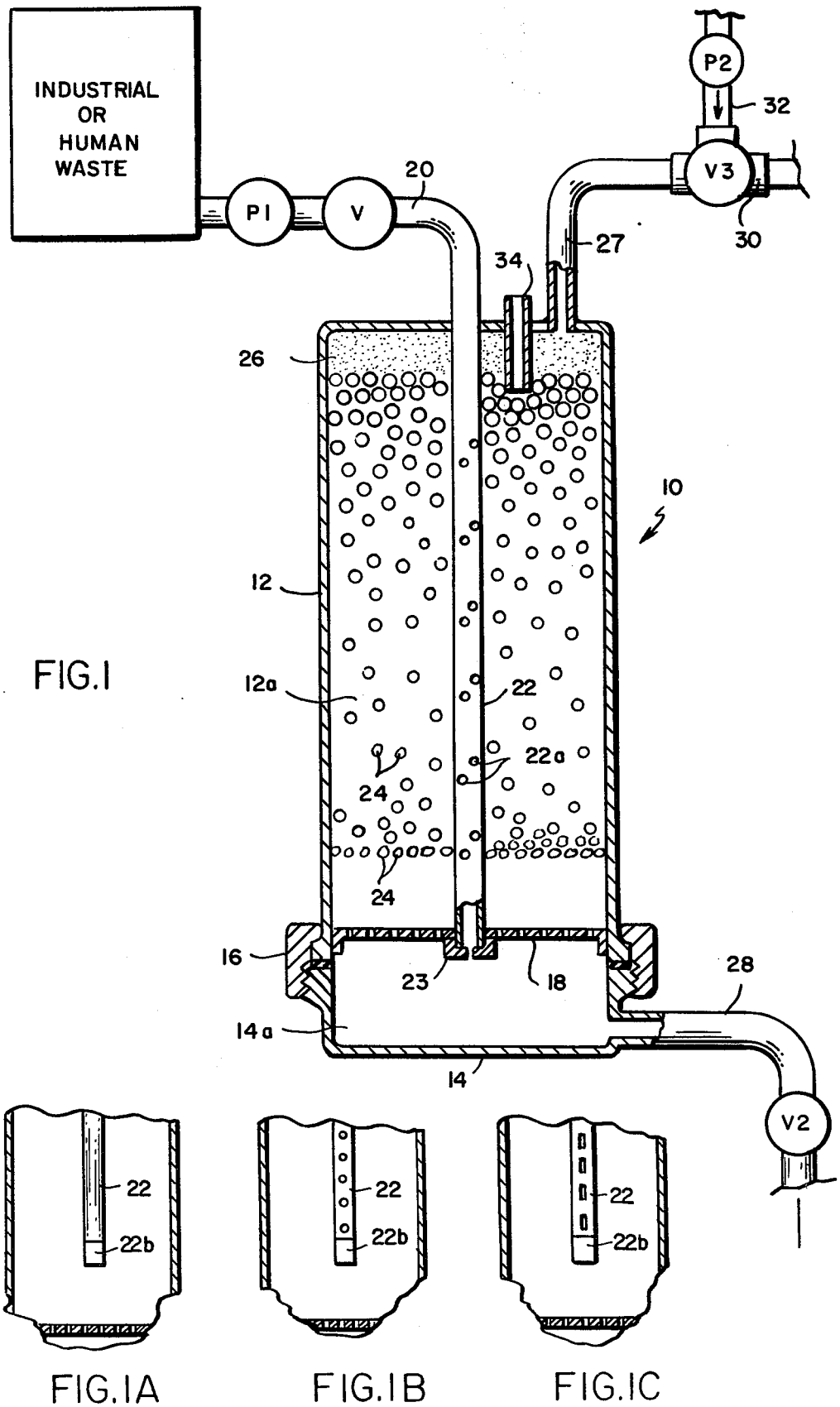
FIG. 1A is a fragmentary elevation of FIG. 1 showing a modification wherein the conductor pipe is imperforate and is provided with a relief valve at its lower end.
FIG. 1B is a fragmentary elevation of a perforate conductor pipe wherein the perforations are arranged rectilinearly.
FIG. 1C is a fragmentary elevation of a perforated conductor pipe wherein the perforations are slots.

As illustrated in FIG. 1, the filter in one form comprises a tank 10 embodying an upper part defining a chamber 12a and a lower part 14 defining a chamber 14a. The lower part 14 is removably connected to the upper part 12 by a threaded ring 16. The chamber 12a defined by the upper part 12 is of considerably larger volume than the chamber 14a defined by the lower part 14 and is separated at its lower end from the chamber 14a defined by the lower part 14 by a rigid, perforated grid 18. A conductor pipe 20 is provided for conducting the fluid to be filtered to the tank 10 and has a portion 22 which extends downwardly from the top of the upper part 12 through the chamber 12a to the bottom, FIG. 1, or partway to the bottom, FIGS. 1A, 1B and 1C. The downwardly-extending portion 22 may be imperforate or contain ports 22a. The ports 22a are longitudinally-spaced, downwardly-inclined at approximately 45° to the axis of the conductor and may be arranged rectilinearly or helically with respect to the axis of the portion 22. The lower end of the portion 22 may be capped with a perforated cap 23, FIG. 1, or may be provided with a relief valve 22b set to open at a predetermined pressure.

The upper part of the conductor pipe 20 externally of the receptacle is connected to the source of fluid to be filtered and has interposed therein a pump P1 and a valve V1. Thus, the fluid to be filtered can be forcibly pumped from the source into the upper part 12 of the tank 10. Optionally, the pump may be bypassed and the fluid permitted to gravitate into the upper part 12 of the tank. The fluid is desirably discharged from the conductor into the midst of the bodies at a pressure of from 20 to 75 psi and, preferably, at approximately 50 psi.

In accordance with this invention, chamber 12a defined by the upper part 12 of the tank is substantially filled with a mass of loosely-associated particulate material comprising solid or hollow, perforate or imperforate bodies 24 of the same or different shape and comprised of a material which is immune to the fluid being filtered. The bodies 24 of particulate material are supported by the perforate plate 18, the perforations of which are too small to permit them to gravitate through the plate into the chamber 14a defined by the part 14. Desirably, a fine filter 26 is employed to remove the residual solid from the filtered fluid and this may be positioned between the top of the body of particulate material and the top of the chamber 12a or at some other point in the plumbing through which the filtered fluid is withdrawn for disposal. This fine filter material may comprise a bat of glass wool or a porous material.

As thus constructed, when the fluid to be filtered is pumped or gravitationally delivered into the midst of the body or bed of particulate material either through the cap or relief valve 23 at the lower end of the imperforate conductor 22, FIG. 1A, or through the perforations 22a of the perforate conductor, FIGS. 1, 1B and 1C, the projection of the fluid delivered into the midst of the bodies causes weltering or swirling of the particulate material with the result that the solid matter contained by the fluid is intercepted as the fluid moves upwardly through the bed and caused to gravitate toward the bottom. The weltering prevents collection of the solid particles in the form of a mat or barrier which would interfere with the efficiency of the bed as a filter. In order to achieve the degree of weltering desired, the fluid preferably would be delivered at a pressure of 10 to 100 psi. The relief valve 22b at the end of the conductor provides for adjusting the pressure to provide optimum weltering for the kind of waste being processed. A pipe 27 is connected to the top of the part 12 through which the filtered fluid is discharged.

There is a conductor 28 at the bottom of the part 14 provided with a valve V2 which, when placed in an open position, will permit discharge of the solids from the chamber 14a. In the event that the solids accumulate in the chamber 14a to such an extent as to be not readily drawn off through the conductor 28, the part 14 may be detached from the part 12 by unscrewing the thread ring 16.

After the filter has been used for a period of time, it may become necessary to flush the particulate bed with clean water to remove solid matter which becomes attached to the surface of the bodies and this is accomplished by reversing the flow through the bed. To provide for such reverse flow, a T 30 is interposed in the pipe 27 including a two-way valve V3. A conductor 32 is connected to the T and a pump P2 in the conductor 32 is provided for supplying clean water through the pipe 27 into the bed of particulate material. During flushing, the valve V is closed, the valve V2 is placed in its open position, and the valve V3 is positioned to cut off flow through the pipe 27 beyond the valve and permit flow from the conductor 32. During normal use, the valve V2 is closed and the valve V3 is positioned to block flow from the conductor 32 and permit flow through the pipe 27 beyond the valve V3. Desirably, a vent pipe 34 is provided at the top of the tank in communication with chamber 12a.

An alternative form of filter is shown in FIG. 2 comprising a closed tank 36 divided by a partition 38 into two side-by-side chambers 40 and 42 which, respectively, constitute a filter chamber and a storage chamber. A perforate container 44 is mounted in a top opening 46 with its bottom above the bottom of the chamber and, optionally, with its sides spaced from the side walls of the chamber. A conductor pipe 50 is provided for conducting the fluid to be filtered to the chamber 40 and has a part 52 which extends downwardly through the top of the container to the bottom thereof. At the lower end of the part 52, there is either a perforated cap 23 or a relief valve 22b such as shown in FIGS. 1A, 1B and 1C. As shown in FIG. 2, part 52 is positioned at substantially the geometrical center of the cross section of the basket and contains longitudinally-spaced ports 54. The ports 54 as shown are arranged helically; however, they may be arranged rectilinearly as shown in FIG. 1B and may be round holes or slots. Optionally, an imperforate pipe may be used, as shown in FIG. 1A, which terminates above the bottom of the container 44 in the midst of the bodies and which may have on its lower end a perforated cap 23 or a relief valve 22b.

The conductor pipe 50 exteriorly of the basket is connected to the source of fluid to be filtered and has interposed in it a pump P3 by means of which the fluid to be treated is forcibly pumped into the filter. It is to be understood, however, that the fluid to be filtered could be gravitationally delivered to the filter. As previously related, the fluid should be delivered into the midst of the bodies at a pressure of 10 to 100 pounds psi, and may be adjusted up or down, depending upon the waste being treated by adjustment of the relief valve.

In accordance with this form of the invention, the container 44 is substantially completely filled with a mass of particulate material 56 such as the bodies described as used to fill the chamber 12a, FIG. 1, and, desirably, a fine filter media 58 is provided between the top of the filter bed and the top of the container, although it can be positioned at some point in the plumbing externally of the tank through which the filtered fluid is withdrawn for disposal. In this form of the invention, the solid matter separated from the fluid gravitates through the perforations at the bottom of the container and, optionally, through the side walls to the bottom of the chamber 40 and the filtered fluid is drawn off through the top of the container and delivered to the storage chamber 42 through a conductor 60 having an end 62 extending through the top of the container and an end 64 extending through the top of the storage chamber 42. The conductor 60 provides for transfer of the filtered fluid from the filter chamber 40 to the storage chamber 42. The filtered fluid is removed from the storage chamber 42 through a conductor 66.

In order to provide for flushing the filter for solids removal when necessary, a T 72 is interposed in the pipe 66 to which there is connected a pipe 74 from a source of clean water. There is a valve V5 in the pipe 66 beyond the T 72 and a valve V6 in the pipe 74. One of several ways to effect flushing is to close the valve V5, open the valve V6 and reverse the pump P4 to force clean water into the chamber 42 and from thence into the chamber 40 and out of the latter through an overflow pipe 76 which is positioned in the chamber 40 with a portion extending downwardly thereinto. Vent pipes 78 and 80 are provided at the top of the respective chambers 40 and 42.

When this system is being used specifically for human waste or for other systems where there is a pronounced odor and/or there is matter which requires decontamination, means in the form of a decontamination feeder 82 may be suspended from the top of the container through an opening 84 therein for holding the decontaminating and deodorizing material. Other means may be employed for effecting decontamination, depending upon the kind of waste being treated, for example, ultraviolet treatment or the like.

In operation, when the waste is delivered into the body of particulate material through the end of the imperforate pipe or the perforations 54 of the perforate pipe 52 into the midst of the bed of particulate material, the jets of fluid cause weltering and dispersion of the particulate bodies in a swirling fashion relative to each other so that the solid matter borne by the fluid is intercepted as the water moves upwardly through the bodies and caused to gravitate downwardly toward the bottom. The weltering prevents choking or matting which would interfere with the efficiency of the bed as a filter.

In both forms of the invention, an important aspect resides in the fact that the forcible ejection of the fluid through the ports or slots in the conductors which deliver the fluid into the midst of the floating bed of particulate bodies causes rolling of the bodies which prevents choking or matting and permits separation of the solids from the fluid and settling to the bottom.

The physical properties of the filter bodies are of importance in obtaining efficient removal of the solid material from the fluid and several forms of the filter material have been found to be especially effective. Desirably, an important physical characteristic of the filter bodies is that the individual bodies be of such density as to hang suspended within the fluid being filtered. In this state of hanging suspension, when the effluent is pumped into the suspended mass, a condition of weltering is produced which, in effect, disperses the bodies sufficiently to allow the effluent to descend throughout the mass to substantially the bottom of the tank, but to immediately reform into a porous mass above the effluent discharged there into it so that as the effluent rises within the tank, the bodies provide a tortious barrier wherein the irregularly-disposed and arranged surfaces entrain the solid matter. The bodies may be made of natural or man-made materials with a density suspended, that is, such as to hang suspended in the fluid.

Apart from the density of the bodies which, as just described, is especially important in bringing about weltering or gyration of the bodies in the bed to thoroughly dissipate the solid material within the bed followed by reformation, the next important property is the physical configuration which preferably is spherical such as shown, for example, in FIG. 3. However, other bodies may be used such as disclosed in FIG. 3A which may be generally described as pear-shaped, elliptical and kidney-shaped. The surfaces of the bodies may be perfectly smooth or slightly roughened. Bodies containing surface pits may be used as shown, for example, in FIGS. 4 and 5, that shown in FIG. 4 being a spherical body containing conical pits and that shown in FIG. 5 being of rectangular configuration containing conical pits. Other configurations which have been used are shown in FIGS. 6 to 10 inclusive.

The bodies should be non-absorptive of material, insoluble, non-corrosive and infrangible. The size of the bodies will depend upon the kind and volume of waste being processed and the degree of separation required. The bodies may be comprised of any suitable material embodying the aforesaid characteristics and made of natural or man-made material, for example, plastics selected from any of such plastic materials as polyethylene, polypropylene, polybutane and glass-reinforced polypropylene.

The extent to which the solid materials are trapped and held in the filter bed is also determined by the extent to which the filter bed fills the tank. However, the tank must not be filled to such an extent as to interfere with the weltering of the particles.

It should be understood that the present disclosure is for the purpose of illustration only.

We claim:

1. Apparatus for filtering a fluid containing extraneous solids comprising a confining tank, fine filter means defining a first perforate barrier at the top of the tank, means defining a second perforate barrier below the first perforate barrier, said first and second perforate barriers defining a space therebetween for receiving a filter bed and said second perforate barrier defining with the bottom of the tank, a repository for filtrate, a bed of buoyant, loosely-associated, discrete filter bodies of such volume as to partially fill the space between said first and second barriers, said second perforate barrier comprising a perforated plate having perforations too small to permit passage of the filter bodies, but large enough to permit extraneous solids to gravitate from said space to said repository, said bed being held against upward displacement at its upper side by said first perforate barrier, but unconstrained at its lower side by said second perforate barrier, a conductor vertically disposed in the tank and centrally positioned to introduce a fluid to be filtered into the midst of the bed below the upper barrier at a pressure of 10 to 100 psi to cause dense packing of the bodies above the region of entry of the fluid into the tank against the first barrier and dispersion of the bodies below the region of entry of the fluid into the bed accompanied by weltering of the dispersed bodies and detachment of the solids from the bodies by such weltering such that the detached solids gravitate downwardly from the dispersed bodies through the second perforate barrier into the repository at the bottom of the tank, means for withdrawing solids from said repository, and means for drawing filtered fluid from the tank upwardly through the densely-packed region of bodies above the region of entry of the fluid into the tank through the first perforate barrier.

2. The method of filtering a fluid containing extraneous solids comprising: confining a bed of buoyant, loosely-associated, discrete filter bodies within a tank between vertically-spaced upper and lower perforate barriers in such volume as to incompletely fill the space between said barriers and to provide a repository below said lower barrier, said upper barrier comprising a fine filter, and said lower barrier comprising a perforated plate having perforations too small to permit passage of the filter bodies, but large enough to permit extraneous solids to gravitate from said space to said repository, introducing said fluid through a vertically disposed conductor, centrally situated in said tank, into the midst of the bed in a region below the upper barrier at a pressure of 10 to 100 psi to cause dense packing of the filter bodies in the bed above the region of entry of the fluid into the bed against the upper one of the perforate barriers and dispersion of the filter bodies of the bed below the region of entry of the fluid into the bed accompanied by weltering of said dispersed filter bodies such as to rub the solids accumulated thereon from the filter bodies to cause gravitation of the solids downwardly through the dispersed filter bodies and through the lower one of the perforate barriers into said repository, collecting the downwardly-gravitating solids in said repository, withdrawing the collected solids from said repository, and drawing off the filtered fluid from the tank upwardly through the densely-packed region of the filter bodies above the place of entry of the fluid into the bed and through the upper one of the perforate barriers.

* * * * *